United States Patent [19]

Veit, Jr. et al.

[11] 4,245,014
[45] Jan. 13, 1981

[54] HIGH PRESSURE POST SEAL FOR BATTERIES

[75] Inventors: William E. Veit, Jr., Ivyland; Kusal K. Das, Wrightstown, both of Pa.

[73] Assignee: ESB International Corp., Wilmington, Del.

[21] Appl. No.: 71,135

[22] Filed: Aug. 30, 1979

[51] Int. Cl.$^2$ .............................................. H01M 2/06
[52] U.S. Cl. ...................................... 429/181; 429/183; 429/184
[58] Field of Search ............... 429/183, 184, 185, 181, 429/178, 180, 171–174

[56] References Cited

U.S. PATENT DOCUMENTS

| | | | |
|---|---|---|---|
| 2,781,414 | 2/1957 | Ensign et al. | 429/184 |
| 3,488,227 | 1/1970 | Siwek | 429/183 |
| 4,053,686 | 10/1977 | Oxeureider | 429/184 X |
| 4,053,693 | 10/1977 | Münch et al. | 429/183 |
| 4,156,756 | 5/1979 | Green | 429/182 |

FOREIGN PATENT DOCUMENTS

| | | | |
|---|---|---|---|
| 583233 | 9/1959 | Canada | 429/183 |
| 321681 | 11/1929 | United Kingdom | 429/183 |

*Primary Examiner*—Anthony Skapars
*Attorney, Agent, or Firm*—E. A. Steen

[57] ABSTRACT

A multistaged high pressure post seal system resistant to acid attack. A post cavity (18), formed within a battery case (14), contains a post (16) projecting through a bore (20) at the base of the cavity (18). An O-ring (24) disposed between the post (16) and the bore (20) of the cavity (18) forms a first seal. A self-sealing member (32 or 40) in communication with the post (16) forms a second seal whereas epoxy (36) introduced into the cavity (18) forms a third seal. Two embodiments are disclosed.

7 Claims, 2 Drawing Figures

HIGH PRESSURE POST SEAL FOR BATTERIES

TECHNICAL FIELD

This invention relates to batteries in general and more specifically to a multistaged post seal system especially suited for secondary battery applications.

BACKGROUND ART

Recently, the demand for small, sealed, rechargeable lead-acid batteries has increased dramatically. In contradistinction to the familiar automotive-type lead-acid batteries, these batteries are small, relatively lightweight, sealed and leakproof. As a consequence, they are capable of delivering a steady current in any position or orientation. Typically, these batteries are employed in emergency lighting systems, portable power and garden tools, engine starting systems and in standby electrical systems for computer applications.

Like all lead-acid batteries, however, these batteries are subject to off-gassing during recharging periods. During the recharge cycle, the water contained within the battery may be decomposed into hydrogen and oxygen. In order to provide long life for these batteries, it is necessary to promote oxygen recombination within each cell. It is known that a pressurized environment between 30–50 pounds per square inch (psi) within the cells will expedite oxygen recombination.

One of the problems facing the battery industry is the maintenance of a sound post seal. Most current designs employ epoxy to seal a lead electrode of post to a plastic battery cover. Unfortunately, it is very difficult to get a good sealing bond between the epoxy and the lead post during typical mass production techniques.

Moreover, over an extended period of time, the sulfuric acid electrolyte tends to creep up the post to the seal. The acid chemically attacks the post thereby resulting in a porous layer on the post. In time, the electrolyte advances up the length of the post and under the epoxy seal until an open direct path is provided to the outside of the cover. This debilitating corrosion action destroys the high pressure seal, thus ensuring electrolyte leakage and shortened battery life.

Clearly, a post seal design that is capable of maintaining a sound seal about a battery post is desirable

SUMMARY OF THE INVENTION

The disclosed invention surmounts the aforementioned difficulties.

Accordingly, there is provided a multistaged high pressure post seal system that is resistant to acid attack. A post cavity is formed within a battery case. A bore, disposed at the base of the cavity, communicates with the interior of the battery. An electrode post projects through the bore into the cavity. A self-sealing member, typically a nut or a screw, threadably engages the post about the bore within the cavity. An O-ring is disposed between the post and the cavity whereas the cavity is sealed with epoxy. A connecting tab, in communication with the post, projects from the cavity.

PREFERRED MODES FOR CARRYING OUT THE INVENTION

Figure 1:
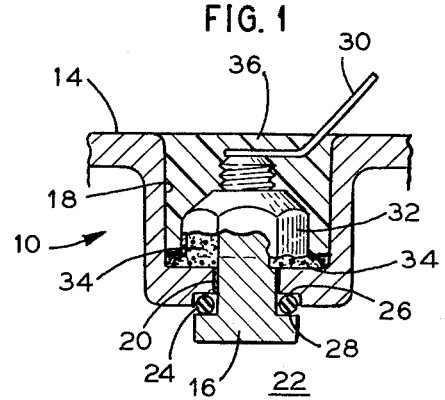
FIG. 1 is a sectional side view of an embodiment of the invention.
Figure 2:
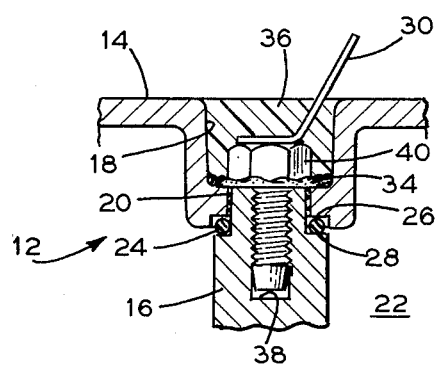
FIG. 2 is a sectional side view of an alternate embodiment of the invention.

FIG. 1 and 2 depict two alternate embodiments of a high pressure battery post seal. For ease of discussion, the post seal system shown in FIG. 1 will carry reference numeral 10, whereas the post seal system, as shown in FIG. 2, will carry reference numeral 12. However, shared component parts will be numbered similarly.

Referring now to FIG. 1, there is shown a partial view of the upper surface of battery case 14. Disposed within the battey case 14 (but not shown) are typical lead-acid battery components. For example, a plurality of alternating positive and negative plates of lead dioxide and lead are immersed in a sulfuric acid ($H_2SO_4$) electrolyte. A series of intercell connectors, called straps, connect the respective plates to a positive terminal and a negative terminal projecting from the battery case 14. For the purposes of this specification, post 16 may be either the positive or negative terminal. The system 10 (and 12) may be utilized with either type of terminal. Typically, a battery will have two terminals. The disclosed embodiments may be utilized with other types of batteries as well.

Post cavity 18 is recesses into the case 14. Bore 20 provides an open communications means between the interior of the battery 22 and the cavity 18. The post 16 projects into the cavity 18 through the bore 20.

A flexible O-ring 24 acts as a sealing washer between post shoulder 28 and cavity recess 26. Tab 30, affixed to the post 16, provides the means for supplying electrical current to external components.

Disposed within the cavity 18 and threadably affixed to the post 16 is a self-threading sealant containing member or nut 32. The nut 32, available commercially under the PALNUT trademark (Ser. No. SKW 188008SC), is designated to extrude an acid-resistant mastic seal 34 about the post 16 and the bore 20 within the cavity 18 as it is tightened down about the post 16. (PALNUT is trademark of TRW). Epoxy filler 36 seals the cavity 18 and the system 10 (and system 12 components contained therein.

Referring now to FIG. 2, there is shown an embodiment of the seal system 12. The two illustrated systems 10 and 12 are similar except that the post 16 includes an opening 38. A self-tapping sealant containing member or screw 40 threadably engages the post 16 within the opening 38. As with the nut 32, the screw 40 extrudes an acid-resistant, mastic seal 34 about the post 16 and the bore 20 within the cavity 18. The mastic sealant may be applied to the underside of the head of the screw 40 prior to the insertion of the screw 40 into the post 16. The tab 30 is affixed to the screw 40.

The invention and the manner of applying it may, perhaps, be better understood by a brief discussion of the principles underlying the invention.

Both systems 10 and 12 are designed to overcome the leakage problem encountered by small rechargeable batteries. In particular, the systems present a three stage seal assembly that is capable of withstanding high internal pressures while, simultaneously, providing long battery life. It is contemplated that the system 10 will be emloyed in larger capacity batteries whereas the system 12 may be utilized in smaller batteries since this design may be made physically smaller than the design of system 10 and thus meet the physical limitations of smaller batteries. However, the two systems 10 and 12 may be used interchangeably.

The first stage seal is formed between the post shoulder 28 and the cavity recess 26 through the offices of the O-ring 24. Besides serving as a first stage washer seal, the O-ring 24 acts as a cushioning member between the post 16 and the battery case cover 14 during final battery assembly when the battery case cover 14 is heat sealably joined to the remainder of the battery case. In view of the fact that the compressible O-ring 24 is exposed to a highly corrosive sulfuric acid environment, the O-ring 24 should be made from an acid resistant material, preferably ethylene propylene copolymer.

The second stage seal is provided by the nut 32 or the screw 40. By tightening the nut 32 or the screw 40, mastic is extruded about the post 16 within the cavity 18, to form an acid-resistant seal bond 34 between the case 14 and the post 16.

The third stage seal is formed by the addition of epoxy 36 into the cavity 18. This reinforcing third stage seal is capable of withstanding internal pressures of 50 psi or more.

It should be appreciated that the disclosed unique designs overcome the problem of sulfuric acid creep. If only an epoxy-post seal system is emloyed, the sulfuric acid will most assuredly creep up the post (which is usually lead). This creeping phenomenon occurs chiefly because the lead electrode has an oxide coating that forms a natural pathway for the sulfuric acid to follow. Due to the corrosive nature of the sulfuric acid, external post seal components eventually fail thereby rendering the battery useless. However, by providing a multistaged sealing system, two immediate benefits are realized. Firstly, the acid is prevented from leaking from the battery, a prime cause of battery failure. And secondly, the resulting multistaged high strength seal is pressure resistant.

While in accordance with the provisions of the statutes, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. In combination with a battery, the battery including a case and at least one terminal post projecting through the case, a post seal system for preventing gas pressure leakage and electrolyte leakage about the post, the system comprising a recessed cavity formed within the case, the cavity including a bore communicating with the interior of the battery, the post extending through the bore, first sealing means disposed between the post and the bore, a sealant-containing member threadably engaging the post within the cavity, the member in sealing registry with the bore, cavity and post, second sealing means disposed within the cavity for sealing the cavity and means for connecting the post to external electrical components.

2. The combination according to claim 1 wherein the member includes an extrudable sulfuric acid-resistant mastic sealant.

3. The combination according to claim 2 wherein the member is a self-threading nut.

4. The combination according to claim 2 wherein the post includes a recessed opening, the member being a screw and the screw threadably disposed within the post.

5. The combination according to claim 1 wherein the first sealing means is a sulfuric acid-resistant O-ring disposed between the post and the bore.

6. The combination according to claim 5 wherein the O-ring is made from ethylene propylene copolymer.

7. The combination according to claim 1 wherein the second sealing means is made from epoxy.

* * * * *